United States Patent
Hars

(10) Patent No.: US 8,127,361 B2
(45) Date of Patent: Feb. 28, 2012

(54) HIERARCHICAL SCHEME FOR SECURE MULTIMEDIA DISTRIBUTION

(75) Inventor: Laszlo Hars, Cranberry Township, PA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1563 days.

(21) Appl. No.: 10/540,185

(22) PCT Filed: Dec. 10, 2003

(86) PCT No.: PCT/IB03/05956
§ 371 (c)(1),
(2), (4) Date: Mar. 20, 2006

(87) PCT Pub. No.: WO2004/057875
PCT Pub. Date: Jul. 8, 2004

(65) Prior Publication Data
US 2006/0230460 A1 Oct. 12, 2006

Related U.S. Application Data

(60) Provisional application No. 60/435,238, filed on Dec. 20, 2002.

(51) Int. Cl.
G06F 17/30 (2006.01)
G06F 12/14 (2006.01)
H04N 7/167 (2011.01)
H04H 40/00 (2008.01)
H04L 9/00 (2006.01)

(52) U.S. Cl. ............ 726/26; 726/27; 713/189; 380/236; 380/237; 380/238; 455/3.06

(58) Field of Classification Search ....................... 726/26
See application file for complete search history.

(56) References Cited

U.S. PATENT DOCUMENTS

| 6,081,784 | A | * | 6/2000 | Tsutsui ........................ 704/501 |
| 6,148,333 | A | * | 11/2000 | Guedalia et al. .............. 709/219 |
| 6,226,618 | B1 | * | 5/2001 | Downs et al. ..................... 705/1 |
| 6,263,313 | B1 | * | 7/2001 | Milsted et al. ..................... 705/1 |
| 6,389,403 | B1 | * | 5/2002 | Dorak, Jr. ....................... 705/52 |
| 6,574,609 | B1 | * | 6/2003 | Downs et al. .................. 705/50 |

(Continued)

FOREIGN PATENT DOCUMENTS

EP 1189432 A 3/2002

(Continued)

OTHER PUBLICATIONS

Cox, Ingemar J.; Kilian, Joe.; Leighton, F. Thomson.; Shamoon, Talal. "Secure Spread Spectrum Watermarking for Multimedia". IEEE Transactions on Image Processing. vol. 6, Issue: 12. Pub. Date: Dec. 1997. Relevant pp. 1673-1687. Found on the World Wide Web at: http://ieeexplore.ieee.org/stamp/stamp.jsp?tp=&arnumber=650120.*

Primary Examiner — Nathan Flynn
Assistant Examiner — Jeremiah Avery

(57) ABSTRACT

Various quality versions of an electronic content are defined, and one or more distortion algorithms (22, 32) that are executable to generate a lower quality version of the electronic content by a distortion of the highest quality version (21, 31) are defined. Each quality version is selectively assigned a content key (CK) whereby an electronic content player (34, 70) will have the appropriate information when decrypting, decoding, and/or distorting the highest quality version (21, 31) of the electronic content.

16 Claims, 4 Drawing Sheets

U.S. PATENT DOCUMENTS

| | | | | |
|---|---|---|---|---|
| 6,587,837 | B1 * | 7/2003 | Spagna et al. | 705/52 |
| 6,601,140 | B1 * | 7/2003 | Okaue et al. | 711/115 |
| 6,961,850 | B1 * | 11/2005 | Stebbings | 713/168 |
| 7,017,189 | B1 * | 3/2006 | DeMello et al. | 726/26 |
| 7,127,431 | B2 * | 10/2006 | Kambayashi et al. | 705/57 |
| 7,167,560 | B2 * | 1/2007 | Yu | 380/200 |
| 7,228,428 | B2 * | 6/2007 | Cousins et al. | 713/179 |
| 7,299,498 | B2 * | 11/2007 | Lee et al. | 726/26 |
| 7,475,246 | B1 * | 1/2009 | Moskowitz et al. | 713/169 |
| 8,024,808 | B1 * | 9/2011 | Gleichauf | 726/26 |
| 2002/0141582 | A1 | 10/2002 | Kocher et al. | |

FOREIGN PATENT DOCUMENTS

WO     WO9912126 A     3/1999

* cited by examiner

HIERARCHICAL SCHEME FOR SECURE MULTIMEDIA DISTRIBUTION

CROSS REFERENCE TO RELATED APPLICATION

This application claims the benefit of U.S. provisional application Ser. No. 60/435,238 filed Dec. 20, 2002, which is incorporated herein by reference.

The present invention generally relates to a secure distribution of electronic content in various forms (e.g., audio, video, text, and images). The present invention specifically relates to a method of securely distributing electronic content based on the highest quality version of the electronic content.

Current technology, as related to the quality of electronic content, is approaching the day when distributed electronic content will be an exact duplication of the original content upon which the electronic content is based. As this technology grows, the production of content players will involve the development of new or improved components that are needed to play the electronic content. However, every consumer will not able to afford to buy the latest content play or to upgrade his or her current content player. Moreover, some consumers will be satisfied with a lower quality version of the electronic content. Therefore, there is a need for a hierarchical scheme for a distribution of various quality versions of electronic content.

The present invention provides a method directed to a secure distribution of various types of electronic content (e.g., audio, video, images, text, etc.) over various types of mediums (e.g., removable disks, networks, etc.) that interface with various types of content players (e.g., recorders, personal computers, etc.).

One form of the present invention is a method of distributing various quality versions of an electronic content. First, each quality version of the electronic content is defined. Second, one or more distortion algorithms executable to generate a lower quality version of the electronic content by a distortion of the highest quality version of the electronic content are defined. Third, each quality version of the electronic content is selectively assigned at least one content key. Fourth, the highest quality version of the electronic content, the distortion algorithm(s) and the content key(s) are distributed in various manners.

A second form of the present invention is an electronic content medium comprising a highest quality version of an electronic content. The electronic content medium further comprises one or more distortion algorithms executable to generate a lower quality version of the electronic content by a distortion of the highest quality version of the electronic content.

A third form of the present invention is an electronic content player comprising a decryption unit operable to decrypt and decode a highest quality version of an electronic content. The player further comprises a distortion unit operable to generate a lower quality version of the electronic content by a distortion of the decrypted and decoded highest quality version of the electronic content.

The foregoing forms as well as other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

Figure 1:
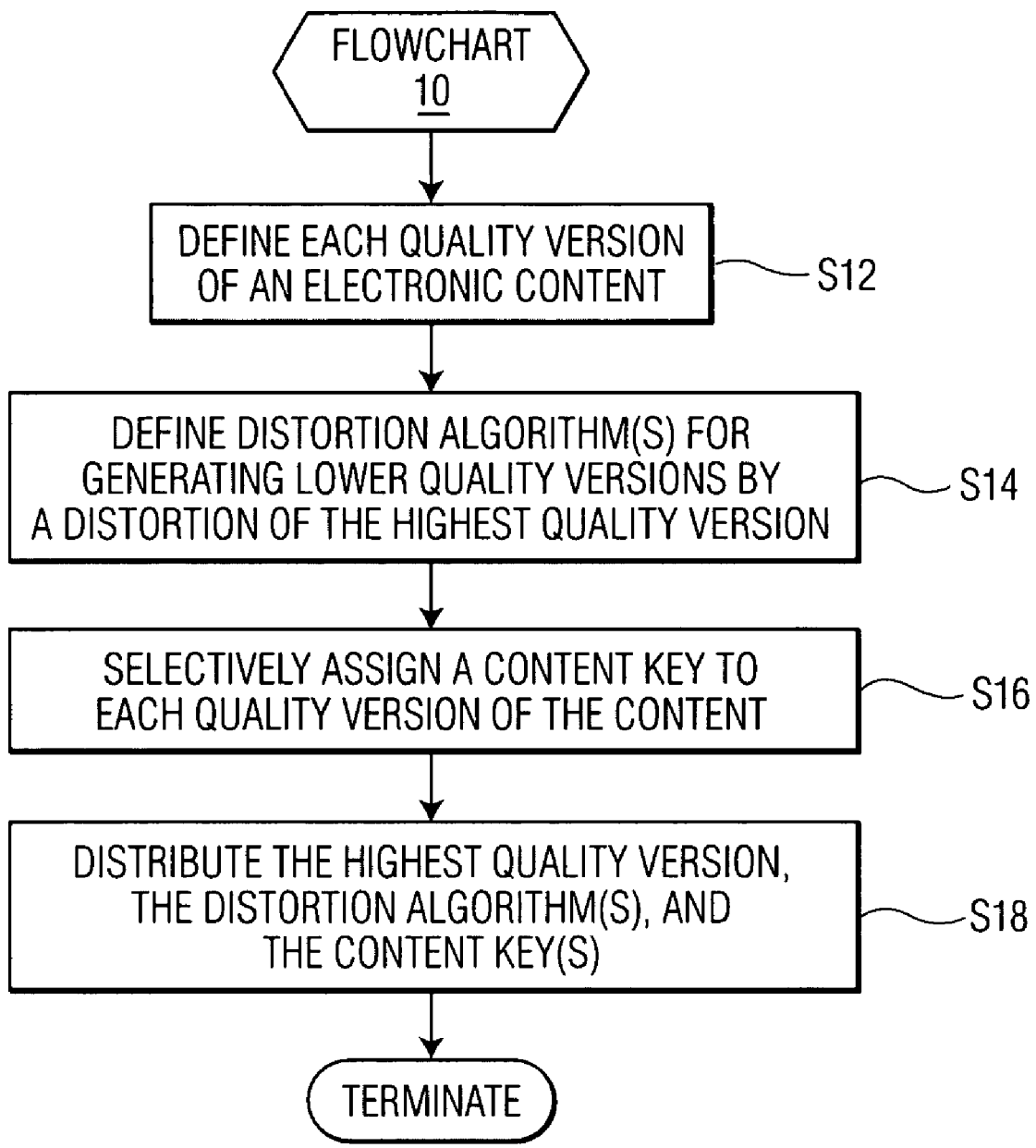
FIG. 1 illustrates a flowchart representative of one embodiment of an electronic content distribution method in accordance with the present invention.

FIG. 1 illustrates a flowchart 10 representative of an electronic content distribution method of the present invention. During a stage S12 of flowchart 10, each quality version of an electronic content is defined by a conventional electronic content hierarchical scheme known in the art. The number and types of attributes of an electronic content as well as the number of quality versions of the electronic content based on the attributes are without limit. The following TABLE 1 is provided to exemplarily illustrate a set of attributes (color, spatial, resolution, and compression) for an electronic content in video form for nine (9) quality versions of the video based on the set of attributes:

TABLE 1

| QUALITY VERSION | COLOR | SPATIAL | RESOLUTION | COMPRESSION |
|---|---|---|---|---|
| Highest | 1 | 1 | 1 | 1 |
| $1^{st}$ Intermediate | 2 | 1 | 1 | 1 |
| $2^{nd}$ Intermediate | 2 | 2 | 1 | 1 |
| $3^{rd}$ Intermediate | 2 | 2 | 2 | 1 |
| $4^{th}$ Intermediate | 2 | 2 | 2 | 2 |
| $5^{th}$ Intermediate | 3 | 2 | 2 | 2 |
| $6^{th}$ Intermediate | 3 | 3 | 2 | 2 |
| $7^{th}$ Intermediate | 3 | 3 | 3 | 2 |
| Lowest | 3 | 3 | 3 | 3 |

In TABLE 1, the highest grade of an attribute is 1 and the lowest grade of an attribute is 3. In the exemplary listing of TABLE 1, the highest quality version includes a grade of 1 for each attribute, the lowest quality version includes a grade 3 for each attribute, and the intermediate quality versions have a quality between the highest quality version and the intermediate quality version. From the exemplary listing of TABLE 1, those having ordinary skill in the art will appreciate the unlimited number and types of attributes of an electronic content as well as the unlimited number of quality versions of the electronic content.

During a stage S14 of the flowchart 10, one or more conventional distortion algorithms as known in the art that are executable to generate a lower quality version of the electronic content by a distortion of the highest quality version of the electronic content are defined. In the exemplary listing of TABLE 1, the distortion algorithm(s) would have to be capable of generating intermediate versions 1-7 as well as the lowest quality version from the highest quality version.

During a stage S16 of the flowchart 10, each quality version is selectively assigned one or more content keys. In one embodiment, the content keys are data blocks including (1) information about the associated quality version that is useable by the distortion algorithm(s), (2) a decryption key for decrypting an encrypted version of the highest quality version, and (3) various legal rights associated with the electronic content, such as, for example, copyrights of the associated quality version. In selectively assigned content keys to each quality version, one or more factors as would be appreciated by those having ordinary skill in the art can be evaluated during stage S16. For example, in selectively assigning content keys to each quality version of TABLE 1, different content keys are assigned to the highest and intermediate quality versions, but a content key is not assigned to the lowest quality version in view of a desire to provide a free, unencrypted sample of the electronic content.

Figure 2:
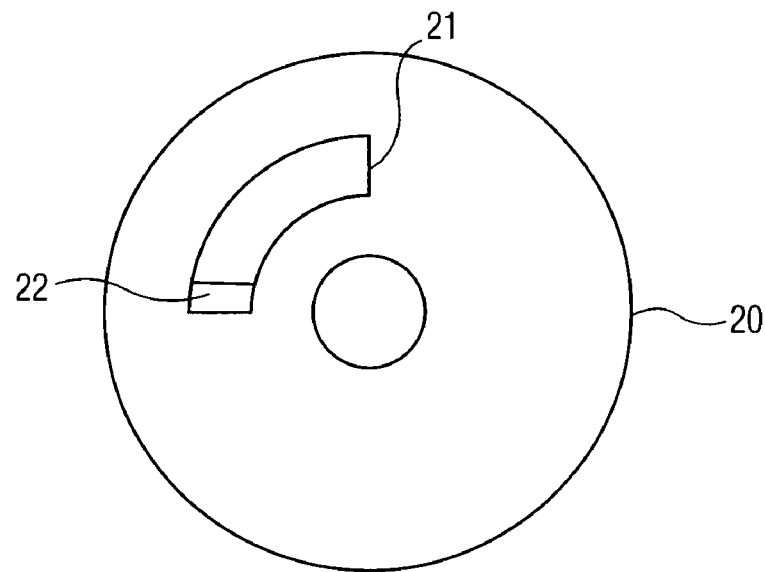
FIG. 2 illustrates an optical disk in accordance with one embodiment of the present invention.
Figure 3:
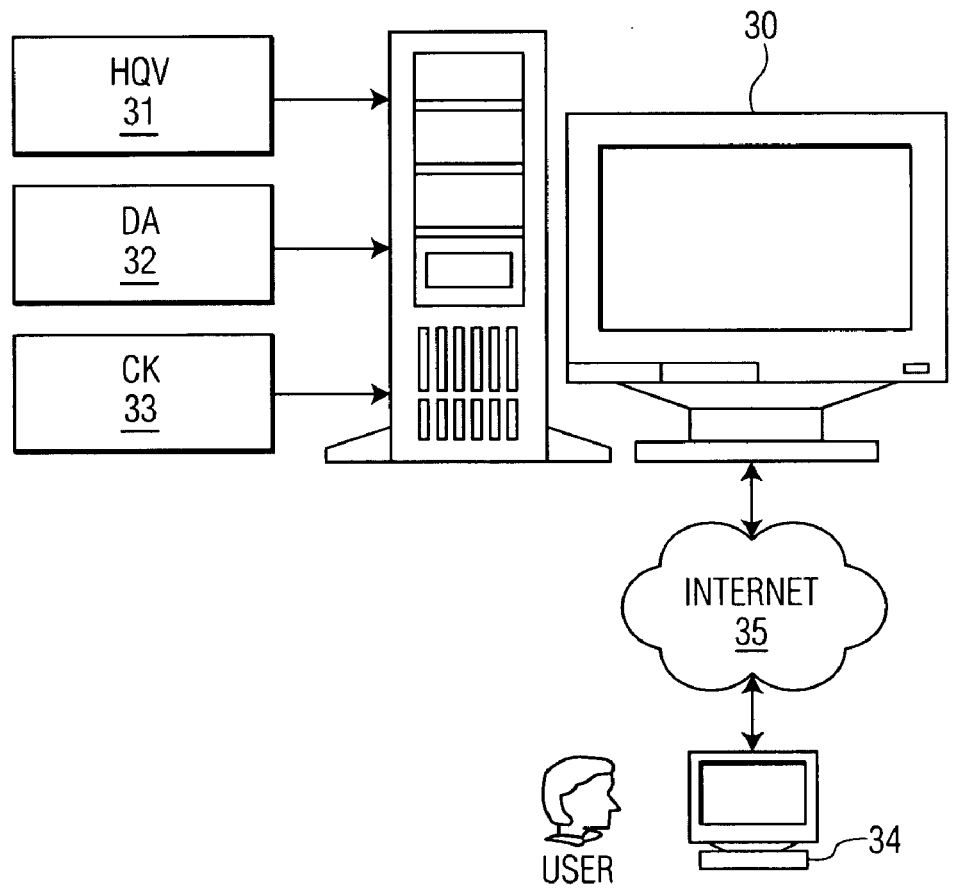
FIG. 3 illustrates a network in accordance with one embodiment of the present invention.

During a stage S18 of the flowchart 10, the highest quality version, the distortion algorithm(s) and the content key(s) are individually or collectively distributed. The types of mediums for distributing the highest quality version, the distortion algorithm(s) and the content key(s) are without limit. For example, FIG. 2 illustrates a DVD 20 storing an encoded and encrypted highest quality version 21 of a song and a distortion algorithm 22 for distorting the highest quality version 21. A content key associated with a desired quality version of the song can be separately purchased. Also by example, FIG. 3 illustrates a web server 30 storing an encoded and encrypted highest quality version 31 of a video clip, a distortion algorithm 32 for distorting the highest quality version 31, and content keys 33. A user of a computer 34 connected to the web server 30 via the Internet 35 can download the highest quality version 31, the distortion algorithm 32, and a purchased content key 33 to computer 34.

Figure 4:
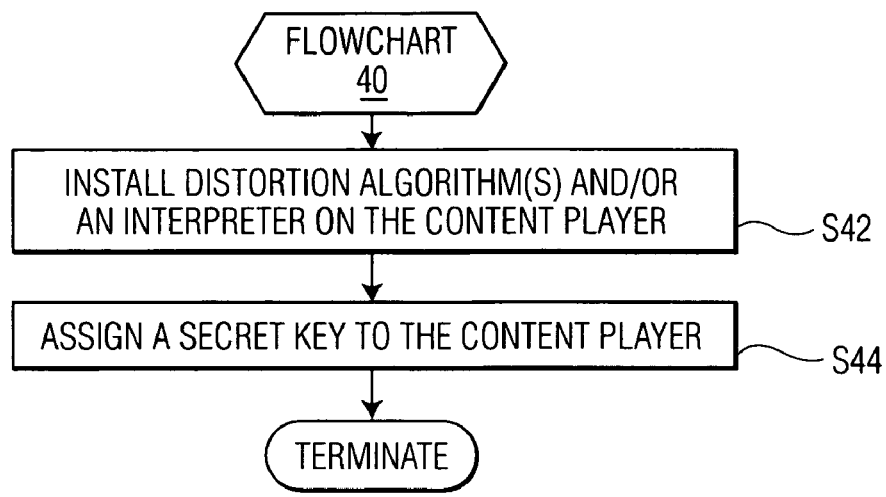
FIG. 4 illustrates a flowchart representative of one embodiment of an electronic content player production method in accordance with the present invention.

FIG. 4 illustrates a flowchart 40 representative of an electronic content player production method of the present invention. During a stage S42 of the flowchart 40, the distortion algorithm(s) defined in stage S14 (FIG. 1) is installed within an electronic content player. Alternatively and/or concurrently, an interpreter for interpreting a distortion description language produced by a distortion algorithm defined in stage S14 is installed within the electronic content player.

During a stage S44 of the flowchart 40, one or more secret keys are assigned to the content player. The factors involved in the assignment of a secret key to the content player is without limit. To illustrate this point, the following TABLE 2 exemplarily lists a categorization of an optical disk player as related to secret keys:

TABLE 2

| | OPTICAL DISK PLAYER: | | | |
|---|---|---|---|---|
| $1^{st}$ CATEGORY | $1^{st}$ Secret Key | | | |
| $2^{nd}$ CATEGORY | CD PLAYER: $2^{nd}$ Secret Key | | DVD PLAYER: $3^{rd}$ Secret Key | |
| $3^{rd}$ CATEGORY | CD-ROM: $4^{th}$ Secret Key | CD-R: $5^{th}$ Secret Key | DVD-ROM: $6^{th}$ Secret Key | DVD-R: $7^{th}$ Secret Key |

From TABLE 2, an assignment of a secret key to the optical disk player is dependent upon a categorization of the optical disk player during stage S44.

Figure 5:
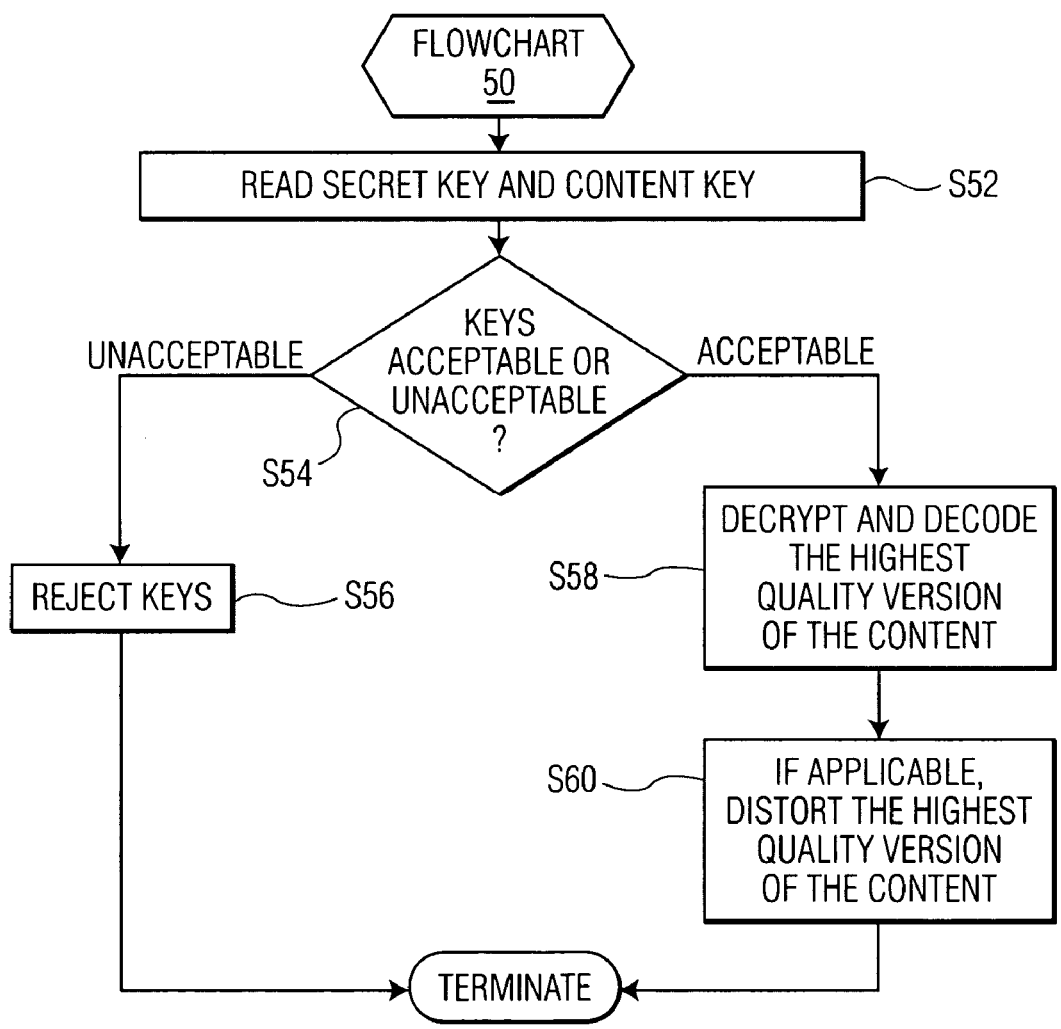
FIG. 5 illustrates a flowchart representative of one embodiment of an electronic content player operation method in accordance with the present invention.
Figure 6:
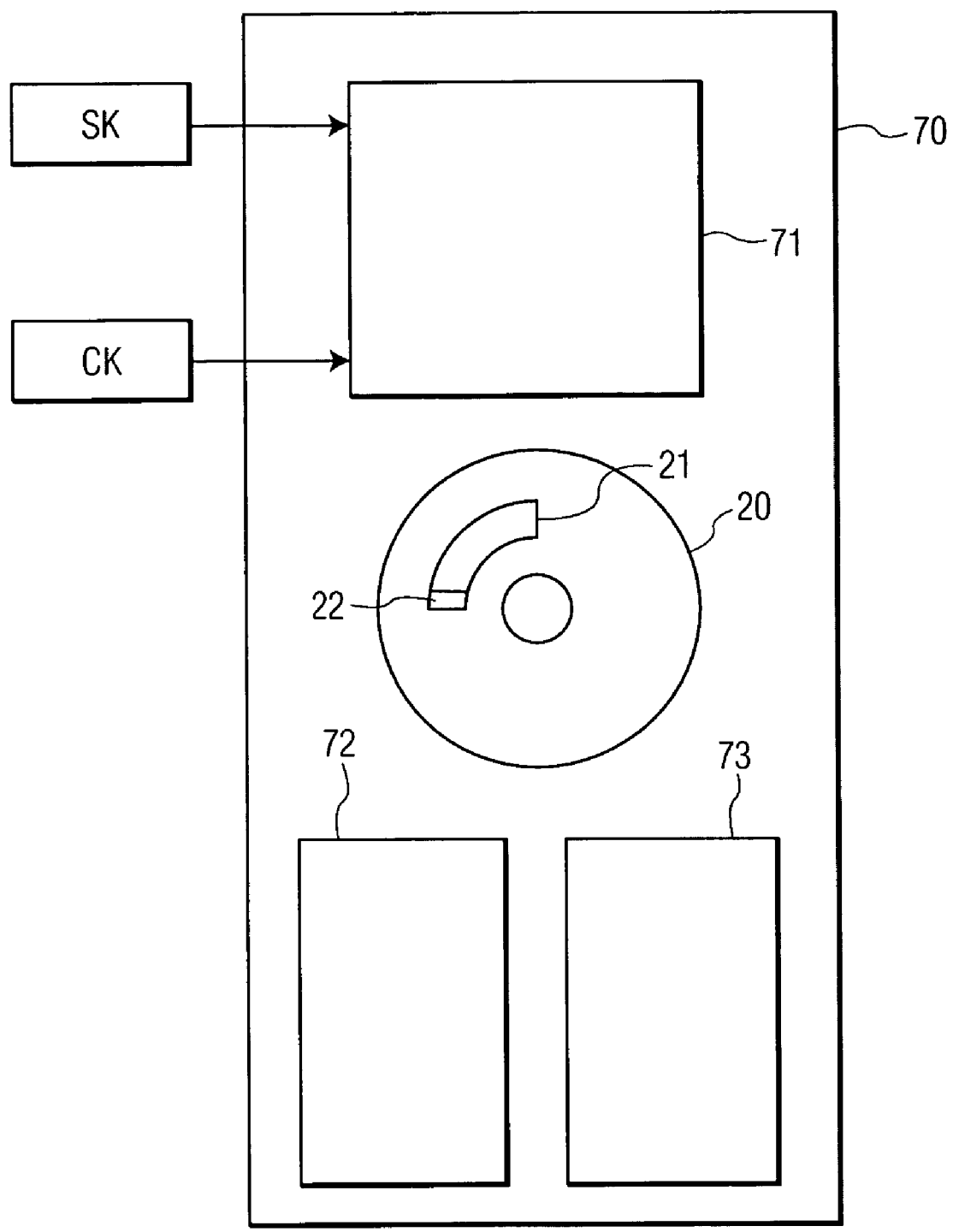
FIG. 6 illustrates an electronic content player in accordance with one embodiment of the present invention.

FIG. 5 illustrates a flowchart 50 representative of an electronic content player operation method of the present invention. To facilitate an understanding of flowchart 50, a description of flowchart 50 will be conjunction with a description a DVD player 70 of DVD 20 as illustrated in FIG. 6. During a stage S52 of flowchart 50, a controller 71 of the content player 70 reads a secret key SK and a content key CK provided by a user of the player 70. Controller 71 will reject the keys SK and CK during a stage S56 of flowchart 50 when the secret key is unacceptable (i.e., it is not the secret key assigned to player 70 during stage S44 of FIG. 4) and/or the content key CK is unacceptable (i.e., it is not assigned to any quality version of the electronic content 20). Otherwise, during a stage S58 of the flowchart 50, the controller 71 directs a decryption unit 72 to decrypt and decode the highest quality version 21 (FIG. 2) of DVD 20 in accordance with content key CK. During a stage S60 of the flowchart 50, if applicable in accordance with the content key CK, the controller directs a distortion unit 73 to execute the distortion algorithm 22 and interpret the distortion language in order to generate a lower quality version of the electronic content that corresponds to the content key. The result is the ability of the player 70 to play a desired quality version of the electronic content.

In alternative embodiments, controller 71, decryption unit 72 and distortion unit 73 can implemented in various other configurations, such as, for example, controller 71 and decryption unit 72 can be integrated, controller 71 and distortion unit 73 can be integrated, and any other configurations as would occur to those having ordinary skill in the art.

Those having ordinary skill in the art will appreciate the applicability of flowchart 50 to other electronic content players, such as, for example, personal computer 34 illustrated in FIG. 3.

It is important to note that FIGS. 1-6 illustrate specific applications and embodiments of the present invention, and is not intended to limit the scope of the present disclosure or claims to that which is presented therein. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of distributing various quality versions of an electronic content, comprising:
   defining each quality version of the electronic content;
   defining at least one distortion algorithm executable to generate a lower quality version of the electronic content by a distortion of a high quality version of the electronic content;
   assigning at least one content key to at least one quality version of the electronic content; and
   distributing the higher quality version, the at least one distortion algorithm, and the at least one content key;
   wherein the distributing includes storing the at least one distortion algorithm on an electronic content player.

2. The method of claim 1, the distributing includes storing the high quality version of the electronic content on an electronic content medium.

3. The method of claim 2, wherein the distributing includes storing the at least one distortion algorithm on the electronic content medium.

4. The method of claim 2, wherein the distributing includes storing the at least one content key on the electronic content medium.

5. The method of claim 1, wherein the distributing includes storing the at least one content key on the electronic content player.

6. An electronic content player, comprising:
   a decryption unit operable to decrypt and decode a high quality version of an electronic content; and a distortion unit operable to generate a lower quality version of the electronic content by a distortion of the decrypted and decoded high quality version of the electronic content.

7. The electronic content player of claim 6, including a controller operable to direct the decryption unit to decrypt and decode the high quality version of the electronic content in accordance with a content key associated with the electronic content.

8. The electronic content player of claim 6, including a controller operable to direct the decryption unit to decrypt and decode the high quality version of the electronic content in accordance with a content key assigned to one of a tower quality version of the electronic content.

9. The electronic content player of claim 6, including a controller operable to direct the decryption unit to decrypt and decode the high quality version of an electronic content in accordance with a content key associated with the electronic content subsequent to a reception of a secret key assigned to the electronic content player.

10. The electronic content player of claim 6, including a controller operable to direct the decryption unit to decrypt and decode the high quality version of an electronic content in accordance with a content key assigned to one of a lower quality version of the electronic content subsequent to a reception of a secret key assigned to the electronic content player.

11. The electronic content player of claim 6, including a controller that is configured to control the distortion unit to generate the lower quality version of the electronic content based on a content key assigned to the lower quality version.

12. The electronic content player of claim 6, including a media reader that is configured to read a media that contains the high quality version of the electronic content.

13. The electronic content player of claim 12, including a controller that is configured to control the distortion unit to generate the lower quality version of the electronic content based on a content key assigned to the lower quality version.

14. The electronic content player of claim 13, wherein the media includes the content key.

15. The electronic content player of claim 13, wherein the controller is configured to obtain the content key independent of the media.

16. The electronic content player of claim 7, wherein the controller is configured to control the distortion unit to generate the lower quality version of the electronic content based on the content key.

* * * * *